United States Patent
Niessner et al.

(10) Patent No.: US 11,603,464 B2
(45) Date of Patent: Mar. 14, 2023

(54) HIGH HEAT RESISTANT ABS MOLDING COMPOSITION

(71) Applicant: INEOS STYROLUTION GROUP GMBH, Frankfurt am Main (DE)

(72) Inventors: Norbert Niessner, Friedelsheim (DE); Gisbert Michels, Leverkusen (DE); KwanHee Lee, Ulsan (KR); Shridhar Madhav, Vadodara (IN); Kirit Gevaria, Vadodara (IN); Nirmalendu Debata, Gujarat (IN)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 123 days.

(21) Appl. No.: 16/970,033

(22) PCT Filed: Feb. 13, 2019

(86) PCT No.: PCT/EP2019/053514
§ 371 (c)(1),
(2) Date: Aug. 14, 2020

(87) PCT Pub. No.: WO2019/158564
PCT Pub. Date: Aug. 22, 2019

(65) Prior Publication Data
US 2021/0108069 A1   Apr. 15, 2021

(30) Foreign Application Priority Data

Feb. 16, 2018 (EP) ..................... 18157105
Apr. 16, 2018 (EP) ..................... 18167450

(51) Int. Cl.
| | | |
|---|---|---|
| C08L 55/02 | (2006.01) |
| C08L 25/12 | (2006.01) |
| C08L 25/14 | (2006.01) |
| C08L 25/16 | (2006.01) |
| C08L 35/06 | (2006.01) |
| C08L 53/02 | (2006.01) |

(52) U.S. Cl.
CPC .............. *C08L 55/02* (2013.01); *C08L 25/12* (2013.01); *C08L 25/14* (2013.01); *C08L 25/16* (2013.01); *C08L 35/06* (2013.01); *C08L 53/02* (2013.01); *C08L 2201/08* (2013.01); *C08L 2205/025* (2013.01); *C08L 2205/035* (2013.01)

(58) Field of Classification Search
CPC .......... C08L 35/06; C08L 25/12; C08L 25/16; C08L 53/02; C08L 55/02; C08L 25/14; C08L 25/08; C08L 2205/025; C08L 2205/035; C08L 2205/03; C08L 2205/02; C08L 2201/08
See application file for complete search history.

(56) References Cited

U.S. PATENT DOCUMENTS

| | | |
|---|---|---|
| 4,009,226 A | 2/1977 | Ott et al. |
| 4,091,053 A | 5/1978 | Kitchen |
| 4,181,788 A | 1/1980 | Wingler et al. |
| 4,374,951 A | 2/1983 | Lee et al. |
| 4,451,617 A | 5/1984 | Khac |
| 4,584,346 A | 4/1986 | Kitchen |
| 4,704,434 A | 11/1987 | Kitchen et al. |
| 4,704,435 A | 11/1987 | Kitchen |
| 4,808,661 A | 2/1989 | Iwamoto et al. |
| 4,994,515 A | 2/1991 | Iyama et al. |
| 5,028,651 A | 7/1991 | Park et al. |
| 5,227,419 A | 7/1993 | Moczygemba et al. |
| 5,314,950 A | 5/1994 | Singh et al. |
| 5,412,036 A | 5/1995 | Traugott et al. |
| 5,532,317 A | 7/1996 | Shinmura et al. |
| 5,714,541 A | 2/1998 | Piejko et al. |
| 6,031,053 A | 2/2000 | Knoll et al. |

(Continued)

FOREIGN PATENT DOCUMENTS

| | | |
|---|---|---|
| DE | 2420358 A1 | 12/1975 |
| DE | 2724360 A1 | 12/1978 |

(Continued)

OTHER PUBLICATIONS

International Preliminary Report on Patentability in International Application No. PCT/EP2019/053514, dated Feb. 3, 2020.

(Continued)

*Primary Examiner* — Angela C Scott
(74) *Attorney, Agent, or Firm* — Raphael Bellum PLLC

(57) ABSTRACT

High heat resistant ABS molding compositions for use in the automotive sector, electronics, and household or healthcare sector comprising: (A) 15 to 35 wt.-% ABS graft copolymer (A); (B) 15 to 35 wt.-% a-methylstyrene/acrylonitrile copolymer (B) (weight ratio 95:5 to 50:50); (C) 20 to 40 wt.-% styrene/acrylonitrile copolymer (C) (weight ratio 95:5 to 50:50; $M_w$ 150,000 to 300,000); (D) 10 to 30 wt.-% random terpolymer (D) made from 13 to 27 wt.-% α, β ethylenically unsaturated cyclic anhydride, 60 to 74 wt.-% aromatic vinyl monomer, and 13 to 27 wt.-% maleimide monomer); (E) 0.1 to 5 wt.-%, of at least one elastomeric block copolymer (E) comprising a vinylaromatic monomer block S and an elastomeric random diene/vinylaromatic onomer block B/S; hard phase proportion is 1 to 40 vol.-% and the diene proportion is less than 50 wt.-%; and (F) 0 to 5 wt.-% of further additives and/or processing aids (F).

24 Claims, No Drawings

(56) References Cited

U.S. PATENT DOCUMENTS

| | | | |
|---|---|---|---|
| 6,096,828 | A | 8/2000 | Deporter et al. |
| 6,114,442 | A | 9/2000 | Jung |
| 6,197,889 | B1 | 3/2001 | Knoll et al. |
| 2007/0260013 | A1 | 11/2007 | Kim et al. |
| 2012/0107540 | A1 | 5/2012 | Knoll et al. |
| 2016/0075813 | A1 | 3/2016 | Niessner et al. |
| 2016/0083572 | A1 | 3/2016 | Niessner et al. |
| 2016/0355673 | A1* | 12/2016 | Knoll ................ C08L 23/12 |
| 2017/0292017 | A1 | 10/2017 | Jung et al. |
| 2017/0355847 | A1 | 12/2017 | Zhou et al. |

FOREIGN PATENT DOCUMENTS

| | | |
|---|---|---|
| JP | 05279549 A * | 10/1993 |
| WO | 95/35335 A1 | 12/1995 |
| WO | 97/40079 A1 | 10/1997 |
| WO | 2012/022710 A1 | 2/2012 |
| WO | 2012/055919 A1 | 5/2012 |
| WO | 2013/085090 A1 | 6/2013 |
| WO | 2014/170406 A1 | 10/2014 |
| WO | 2014/170407 A1 | 10/2014 |

OTHER PUBLICATIONS

Smith et al., "Synthesis and Characterization of PS-PI and PS-PBD Random Copolymers and 'Random-Block' Copolymers via Anionic Polymerizations," Polymer Preprints 34(2):672-673 (1993).

Smith et al., "Styrene-Diene Random Copolymers, Blends and 'Random-Diblock' Copolymers," Polymer Preprints 35(2):466-467 (1994).

* cited by examiner

HIGH HEAT RESISTANT ABS MOLDING COMPOSITION

DESCRIPTION

The invention is directed to ABS thermoplastic molding compositions that exhibit ultra-high heat resistance along with good mechanical properties, a process for their preparation and its uses, in particular in the automotive sector, electronics, and household or healthcare sector.

Automotive industries are extensively using Acrylonitrile Butadiene Styrene (ABS) plastics for its characteristic features like good aesthetics, dimensional stability, impact strength, well balanced mechanical properties, chemical resistance and ease of processing. Apart from auto sector, ABS finds applications in electronics, household and healthcare sectors. When considering auto sector, ABS components are mainly used in exterior as well as in interior applications, many of which demands for a high heat resistance along with good mechanical properties. Heat resistance of ABS modified in conventional manner (e.g. by addition of antimony based ingredients) often not meet the stringent requirements identified by the auto industry.

U.S. Pat. No. 4,994,515 discloses a heat resistant resin composition comprising a heat resistant resin (A) such as a SAN-N-PMI copolymer or an ABS-N-PMI graft copolymer and a thermoplastic resin (B), in particular a high impact resin such as an ABS graft copolymer or a SAN copolymer resin.

U.S. Pat. No. 5,314,950 describes heat resistant resin compositions comprising a N-(2,3-dimethylphenyl)-maleimide homo- or copolymer (example with styrene) and a SAN-copolymer. The blend can further comprise a graft copolymer made from said maleimide, butadiene, styrene and acrylonitrile.

U.S. Pat. No. 5,714,541 describes a high heat resin composition comprising (A) an ABS-graft copolymer with N-(2-ethyl-6-methyl)-phenylmaleimide as further graft comonomer, and (B) a thermoplastic vinyl resin, in particular a SAN-copolymer comprising a N-aryl-maleimide (e.g. N-PMI) as further comonomer.

U.S. Pat. Nos. 5,412,036 and 4,808,661 disclose maleimide (e.g. N-PMI) modified high heat resistant ABS resins comprising SAN/N-PMI-matrix copolymers and graft copolymers with SAN and N-PMI grafted on a diene rubber (e.g. PB or SBC).

U.S. Pat. No. 4,451,617 deals with blends comprising a styrene-maleic anhydride (SMSA) copolymer and a N-PMI/styrene or N-PMI/α-methyl styrene copolymer.

U.S. Pat. No. 4,374,951 describes ABS type polymer blends comprising a N-PMI/styrene- or N-PMI/SAN-copolymer and a SAN matrix copolymer which optionally further comprises a graft copolymer grafted with SAN or SAN/N-PMI.

U.S. Pat. No. 5,028,651 discloses a heat resistant resin composition comprising as matrix resin an ABS or ABS-N-PMI (N-phenylmaleimide) graft copolymer (A) and a SAN-copolymer (or N-PMI-SAN-copolymer) (B).

The process of manufacture of such resin compositions—in particular the grafting of N-aryl or -alkyl maleimides to base rubber parts—requires meticulous efforts and precise control, otherwise will lead to production of resins which are inferior in other mechanical properties.

U.S. Pat. No. 6,114,442 discloses a heat resistant styrene based resin composition comprising an ABS graft copolymer (A), a SAN-copolymer (B) and—as heat resistant components—an AMS-based SAN copolymer (D) (preferably 10 to 30 pbw), and/or a N-PMI-based SAN copolymer (E) (examples 20 to 50 pbw).

US 2007/0260013 discloses heat resistant ABS resin compositions comprising a graft copolymer A) with SAN grafted on polybutadiene, a SAN copolymer B) (30 wt.-% AN, Mw 200,000), a terpolymer C) of styrene, MSA and N-PMI (5/50/45 pbw). The composition further comprises a modified clay D). The terpolymer C) is preferably used in amounts of 5 to 20 pbw (example 4 pbw), based on 100 pbw in total of components A) and B).

U.S. Pat. No. 5,532,317 discloses heat resistant ABS resin compositions comprising a graft copolymer A) with SAN grafted on polybutadiene (example: graft ratio 40%), a SAN copolymer B) (example: 25 wt.-% AN, Mw 128,000), a terpolymer C) of styrene, N-PMI and MSA (example:47/51/2 pbw).

However, said prior art ABS molding compositions often bear certain limitations (e.g. non-satisfying impact strength) and are only able to attain heat deflection temperatures between 90 and 100° C.

It is one object of the invention to provide ABS molding compositions which exhibit an excellent heat resistance to avoid distortion and warpage in heat cycle tests and have a heat deflection temperature above 105° C.

Furthermore, said ABS molding compositions shall have optimized mechanical properties (e.g. enhanced impact strength) and an improved processability. One further objective is to fulfill the quality requirements of the automotive industry in respect to each of the components supplied to the ABS composition.

One aspect of the invention is a thermoplastic molding composition comprising (or consisting of) components A, B, C, D, E and F:

(A) 15 to 35 wt.-% of at least one graft copolymer (A) consisting of 15 to 60 wt.-% of a graft sheath (A2) and 40 to 85 wt.-% of a graft substrate—an agglomerated butadiene rubber latex—(A1), where (A1) and (A2) sum up to 100 wt.-%, obtained by emulsion polymerization of styrene and acrylonitrile in a weight ratio of 95:5 to 65:35 to obtain a graft sheath (A2), it being possible for styrene and/or acrylonitrile to be replaced partially (less than 50 wt.-%) by alpha-methylstyrene, methyl methacrylate or maleic anhydride or mixtures thereof, in the presence of at least one agglomerated butadiene rubber latex (A1) with a median weight particle diameter $D_{50}$ of 150 to 800 nm, where the agglomerated rubber latex (A1) is obtained by agglomeration of at least one starting butadiene rubber latex (S-A1) having a median weight particle diameter $D_{50}$ of equal to or less than 120 nm, preferably equal to or less than 110 nm;

(B) 15 to 35 wt.-% of at least one copolymer (B) of alpha-methylstyrene and acrylonitrile in a weight ratio of from 95:5 to 50:50, preferably 75:25 to 55:45, it being possible for alpha-methylstyrene and/or acrylonitrile to be partially (less than 50 wt.-%) replaced by methyl methacrylate, maleic anhydride and/or 4-phenylstyrene;

(C) 20 to 40 wt.-% of at least one copolymer (C) of styrene and acrylonitrile in a weight ratio of from 95:5 to 50:50, preferably 78:22 to 65:33, more preferably 75:25 to 70:30, most preferred 74:26 to 72:28, it being possible for styrene and/or acrylonitrile to be partially (less than 50 wt.-%) replaced by methyl methacrylate, maleic anhydride and/or 4-phenylstyrene;

wherein copolymer C has a weight average molar mass $M_w$ of 150,000 to 300,000 g/mol;

(D) 10 to 30 wt.-% of at least one random terpolymer (D) comprising 13 to 27 wt.-% recurring units of an α, β ethylenically unsaturated cyclic anhydride, 60 to 74 wt.-% recurring units of an aromatic vinyl monomer, and 13 to 27 wt.-% recurring units of a maleimide monomer;

(E) 0.1 to 5 wt.-%, of at least one elastomeric block copolymer (E) comprising at least one block S which forms a hard phase and incorporates units of a vinylaromatic monomer, and at least one elastomeric block B/S which forms a soft phase and incorporates both units of a vinylaromatic monomer and of a conjugated diene, where S is the vinylaromatic block and B/S is the soft phase, wherein the block is built up randomly from diene units and vinylaromatic units, and where the glass transition temperature Tg of the block S is above 25° C., and that of the block B/S is below 25° C., and the phase volume ratio of block S to block B/S is selected so that the proportion of hard phase in the entire block copolymer is from 1 to 40% by volume and the proportion of the diene is less than 50% by weight, based on the entire block copolymer (E);

(F) 0 to 5 wt.-% of further additives and/or processing aids (F);

where the components A, B, C, D, E and, if present F, sum to 100 wt.-%. The term (about) is used to show that the amount can be slightly higher or lower, in order to fulfill the total sum of 100 wt.-%.

If component (F) is present, its minimum amount is 0.01 wt.-%, based on the entire thermoplastic molding composition molding compound. Wt.-% means percent by weight.

The term "diene" means a conjugated diene; "butadiene" means 1,3-butadiene.

The median weight particle diameter $D_{50}$, also known as the $D_{50}$ value of the integral mass distribution, is defined as the value at which 50 wt.-% of the particles have a diameter smaller than the $D_{50}$ value and 50 wt.-% of the particles have a diameter larger than the $D_{50}$ value. In the present application the weight-average particle diameter $D_w$, in particular the median weight particle diameter $D_{50}$, is determined with a disc centrifuge (e.g.: CPS Instruments Inc. DC 24000 with a disc rotational speed of 24 000 rpm).

The weight-average particle diameter $D_w$ is defined by the following formula (see G. Lagaly, O. Schulz and R. Ziemehl, Dispersionen und Emulsionen: Eine Einführung in die Kolloidik feinverteilter Stoffe einschließlich der Tonminerale, Darmstadt: Steinkopf-Verlag 1997, ISBN 3-7985-1087-3, page 282, formula 8.3b):

$$D_w = \text{sum}(n_i * d_i^4)/\text{sum}(n_i * d_i^3)$$

$n_i$: number of particles of diameter $d_i$.

The summation is performed from the smallest to largest diameter of the particles size distribution. It should be mentioned that for a particles size distribution of particles with the same density which is the case for the starting rubber latices and agglomerated rubber latices the volume average particle size diameter Dv is equal to the weight average particle size diameter Dw.

The weight average molar mass $M_w$ is determined by GPC (solvent: tetrahydrofuran, polystyrene as polymer standard) with UV detection according to DIN 55672-1:2016-03.

The glass transition temperature Tg is determined by Differential scanning calorimetry (DSC) according to DIN EN ISO 11357-2:2014-07.

Often, the thermoplastic molding composition of the invention comprises (or consists of):
15 to 35 wt.-% component (A),
15 to 35 wt.-% component (B),
20 to 40 wt.-% component (C),
10 to 30 wt.-% component (D),
0.1 to 5 wt.-% component (E),
0.1 to 5 wt.-% component (F).

It is preferred that the thermoplastic molding composition comprises (or consists of):
20 to 30 wt.-% component (A),
20 to 30 wt.-% component (B),
25 to 35 wt.-% component (C),
15 to 25 wt.-% component (D),
0.3 to 3 wt.-% component (E),
0 to 5 wt.-%, preferably 0.1 to 5 wt.-% component (F).

It is more preferable that the thermoplastic molding composition comprises (or consists of):
20 to 30 wt.-% component (A),
20 to 30 wt.-% component (B),
25 to 35 wt.-% component (C),
15 to 25 wt.-% component (D),
0.3 to 3 wt.-% component (E),
0.1 to 5 wt.-% component (F).

It is preferable that the thermoplastic molding composition comprises (or consists of):
22 to 27 wt.-% component (A),
22 to 26 wt.-% component (B),
27 to 32 wt.-% component (C),
17 to 22 wt.-% component (D),
0.3 to 2 wt.-% component (E),
0.1 to 5 wt.-% component (F).

One further aspect of the invention is a thermoplastic molding composition comprising (or consisting of) components A, B, C, D, E and F, wherein components A, B, C, D, E and F are as defined above and component E is partly or totally replaced by a component E'. Component E' is at least one, preferably one, elastomeric block copolymer (E') which is a coupled conjugated diene/monovinylarene block copolymer comprising one or more conjugated diene/monovinylarene tapered polymer blocks, where—in the final block copolymer—all conjugated diene is incorporated into the tapered blocks, and—based on the total weight of the final block copolymer—the monovinylarene is present in an amount of 55 to 80 wt.-%, and the conjugated diene is present in an amount of 20 to 45 wt.-%.

Often the thermoplastic molding composition according to the invention comprises (or consists of) components A, B, C, D, E and F, wherein components A, B, C, D, E and F are as defined above and component E is totally replaced by a component E'.

According to this embodiment the thermoplastic molding composition comprises (or consists of) components A, B, C, D, E' and F, wherein components A, B, C, D, E' and F are as defined above.

Said thermoplastic molding composition generally comprises (or consists of):
15 to 35 wt.-% component (A),
15 to 35 wt.-% component (B),
20 to 40 wt.-% component (C),
10 to 30 wt.-% component (D),
0.1 to 5 wt.-% component (E'),
0 to 5 wt.-% component (F), often 0.1 to 5 wt.-% component (F).

It is preferred that the thermoplastic molding composition comprises (or consists of):
20 to 30 wt.-% component (A),
20 to 30 wt.-% component (B),
25 to 35 wt.-% component (C),
15 to 25 wt.-% component (D),
0.3 to 3 wt.-% component (E'), 0 to 5 wt.-%, preferably 0.1 to 5 wt.-% component (F).

It is more preferable that the thermoplastic molding composition comprises (or consists of):
20 to 30 wt.-% component (A),
20 to 30 wt.-% component (B),
25 to 35 wt.-% component (C),
15 to 25 wt.-% component (D),
0.3 to 3 wt.-% component (E'),
0.1 to 5 wt.-% component (F).

It is preferable that the thermoplastic molding composition comprises (or consists of):
22 to 27 wt.-% component (A),
22 to 26 wt.-% component (B),
27 to 32 wt.-% component (C),
17 to 22 wt.-% component (D),
0.3 to 2 wt.-% component (E'),
0.1 to 5 wt.-% component (F).

In addition to the components (A), (B), (C), (D), (E) and (F), or in addition to the components (A), (B), (C), (D), (E') and (F), the inventive thermoplastic molding composition may contain further rubber-free thermoplastic resins (TP) not composed of vinyl monomers, such thermoplastic resins (TP) being used in amounts of up to 1 parts by weight, preferably up to 0.8 parts by weight and particularly preferably up to 0.6 parts by weight (in each case based on 100 parts by weight of the total of (A), (B), (C), (D), (E) and (F) or (A), (B), (C), (D), (E') and (F)).

The thermoplastic resins (TP) as the rubber-free copolymer in the thermoplastic molding composition according to the invention which can be used in addition to the mentioned components (A), (B), (C), (D), (E) and (F), or components (A), (B), (C), (D), (E') and (F), include for example polycondensation products, for example aromatic polycarbonates, aromatic polyester carbonates, polyesters, polyamides. Suitable thermoplastic polycarbonates, polyester carbonates, polyesters and polyamides are known and described on pages 14 to 18 of WO 2012/022710.

Preference is given to thermoplastic molding compositions not comprising a further component TP.

Component (A)

Graft copolymer (A) (component (A)) is known and described e.g. in WO 2012/022710, WO 2014/170406 and WO 2014/170407.

Graft copolymer (A) consists of 15 to 60 wt.-% of a graft sheath (A2) and 40 to 85 wt.-% of a graft substrate—an agglomerated butadiene rubber latex—(A1), where (A1) and (A2) sum up to 100 wt.-%.

Preferably graft copolymer (A) is obtained by emulsion polymerization of styrene and acrylonitrile in a weight ratio of 80:20 to 65:35, preferably 74:26 to 70:30, to obtain a graft sheath (A2), it being possible for styrene and/or acrylonitrile to be replaced partially (less than 50 wt.-%, preferably less than 20 wt.-%, more preferably less than 10 wt.-%, based on the total amount of monomers used for the preparation of (A2)) by alpha-methylstyrene, methyl methacrylate or maleic anhydride or mixtures thereof, in the presence of at least one agglomerated butadiene rubber latex (A1) with a median weight particle diameter $D_{50}$ of 150 to 800 nm, preferably 180 to 700 nm, more preferably 200 to 600 nm, most preferred 250 to 500 nm, in particular preferred 300 to 400 nm.

Preferably the at least one, preferably one, graft copolymer (A) consists of 20 to 50 wt.-% of a graft sheath (A2) and 50 to 80 wt.-% of a graft substrate (A1).

More preferably graft copolymer (A) consists of 30 to 45 wt.-% of a graft sheath (A2) and 55 to 70 wt.-% of a graft substrate (A1).

Most preferably graft copolymer (A) consists of 35 to 45 wt.-% of a graft sheath (A2) and 55 to 65 wt.-% of a graft substrate (A1).

Preferably the obtained graft copolymer (A) has a core-shell-structure; the graft substrate (a1) forms the core and the graft sheath (A2) forms the shell.

Preferably for the preparation of the graft sheath (A2) styrene and acrylonitrile are not partially replaced by one of the above-mentioned comonomers; preferably styrene and acrylonitrile are polymerized alone in a weight ratio of 95:5 to 65:35, preferably 80:20 to 65:35, more preferably 74:26 to 70:30.

The agglomerated rubber latex (A1) may be obtained by agglomeration of at least one starting butadiene rubber latex (S-A1) having a median weight particle diameter $D_{50}$ of equal to or less than 120 nm, preferably equal to or less than 110 nm, with at least one acid anhydride, preferably acetic anhydride or mixtures of acetic anhydride with acetic acid, in particular acetic anhydride, or alternatively, by agglomeration with a dispersion of an acrylate copolymer.

The at least one, preferably one, starting butadiene rubber latex (S-A1) preferably has a median weight particle diameter $D_{50}$ of equal to or less than 110 nm, particularly equal to or less than 87 nm.

The term "butadiene rubber latex" means polybutadiene latices produced by emulsion polymerization of butadiene and less than 50 wt.-% (based on the total amount of monomers used for the production of polybutadiene polymers) of one or more monomers that are copolymerizable with butadiene as comonomers.

Examples for such monomers include isoprene, chloroprene, acrylonitrile, styrene, alpha-methylstyrene, $C_1$-$C_4$-alkylstyrenes, $C_1$-$C_8$-alkylacrylates, $C_1$-$C_8$-alkylmethacrylates, alkyleneglycol diacrylates, alkylenglycol dimethacrylates, divinylbenzol; preferably, butadiene is used alone or mixed with up to 30 wt.-%, preferably up to 20 wt.-%, more preferably up to 15 wt.-% styrene and/or acrylonitrile, preferably styrene.

Preferably the starting butadiene rubber latex (S-A1) consists of 70 to 99 wt.-% of butadiene and 1 to 30 wt.-% styrene.

More preferably the starting butadiene rubber latex (S-A1) consists of 85 to 99 wt.-% of butadiene and 1 to 15 wt.-% styrene.

Most preferably the starting butadiene rubber latex (S-A1) consists of 85 to 95 wt.-% of butadiene and 5 to 15 wt.-% styrene.

The agglomerated rubber latex (graft substrate) (A1) may be obtained by agglomeration of the above-mentioned starting butadiene rubber latex (S-A1) with at least one acid anhydride, preferably acetic anhydride or mixtures of acetic anhydride with acetic acid, in particular acetic anhydride.

The preparation of graft copolymer (A) is described in detail in WO 2012/022710. It can be prepared by a process comprising the steps: α) synthesis of starting butadiene rubber latex (S-A1) by emulsion polymerization, β) agglomeration of latex (S-A1) to obtain the agglomerated butadiene rubber latex (A1) and γ) grafting of the agglomerated butadiene rubber latex (A1) to form a graft copolymer (A).

The synthesis (step α)) of starting butadiene rubber latices (S-A1) is described in detail on pages 5 to 8 of WO 2012/022710 A1. Preferably the starting butadiene rubber latices (S-A1) are produced by an emulsion polymerization process using metal salts, in particular persulfates (e.g. potassium persulfate), as an initiator and a rosin-acid based emulsifier.

As resin or rosin acid-based emulsifiers, those are being used in particular for the production of the starting rubber latices by emulsion polymerization that contain alkaline salts of the rosin acids. Salts of the resin acids are also known as rosin soaps. Examples include alkaline soaps as sodium or potassium salts from disproportionated and/or dehydrated and/or hydrated and/or partially hydrated gum rosin with a content of dehydroabietic acid of at least 30 wt.-% and preferably a content of abietic acid of maximally 1 wt.-%. Furthermore, alkaline soaps as sodium or potassium salts of tall resins or tall oils can be used with a content of dehydroabietic acid of preferably at least 30 wt.-%, a content of abietic acid of preferably maximally 1 wt.-% and a fatty acid content of preferably less than 1 wt.-%.

Mixtures of the aforementioned emulsifiers can also be used for the production of the starting rubber latices. The use of alkaline soaps as sodium or potassium salts from disproportionated and/or dehydrated and/or hydrated and/or partially hydrated gum rosin with a content of dehydroabietic acid of at least 30 wt.-% and a content of abietic acid of maximally 1 wt.-% is advantageous.

Preferably the emulsifier is added in such a concentration that the final particle size of the starting butadiene rubber latex (S-A1) achieved is from 60 to 110 nm (median weight particle diameter $D_{50}$).

Polymerization temperature in the preparation of the starting rubber latices (S-A1) is generally 25° C. to 160° C., preferably 40° C. to 90° C. Further details to the addition of the monomers, the emulsifier and the initiator are described in WO 2012/022710. Molecular weight regulators, salts, acids and bases can be used as described in WO 2012/022710.

Then the obtained starting butadiene rubber latex (S-A1) is subjected to agglomeration (step β)) to obtain agglomerated rubber latex (A1).

The agglomeration with at least one acid anhydride is described in detail on pages 8 to 12 of WO 2012/022710. Preferably acetic anhydride, more preferably in admixture with water, is used for the agglomeration. Preferably the agglomeration step β) is carried out by the addition of 0.1 to 5 parts by weight of acetic anhydride per 100 parts of the starting rubber latex solids.

The agglomerated rubber latex (A1) is preferably stabilized by addition of further emulsifier while adjusting the pH value of the latex (A1) to a pH value (at 20° C.) between pH 7.5 and pH 11, preferably of at least 8, particular preferably of at least 8.5, in order to minimize the formation of coagulum and to increase the formation of a stable agglomerated rubber latex (A1) with a uniform particle size. As further emulsifier preferably rosin-acid based emulsifiers as described above in step α) are used. The pH value is adjusted by use of bases such as sodium hydroxide solution or preferably potassium hydroxide solution.

The obtained agglomerated rubber latex (A1) has a median weight particle diameter $D_{50}$ of generally 150 to 800 nm, preferably 180 to 700 nm, more preferably 200 to 600 nm, most preferred 250 to 500 nm, in particular preferred 300 to 400 nm. The agglomerated latex rubber latex (A1) obtained according to this method is preferably monomodal.

Alternatively the agglomeration can be done by adding a dispersion of an acrylate polymer.

Preference is given to the use of dispersions of copolymers of $C_1$ to $C_4$-alkyl acrylates, preferably of ethyl acrylate, with from 0.1 to 10% by weight of monomers which form polar polymers, examples being acrylic acid, methacrylic acid, acrylamide, methacrylamide, N-methylol methacrylamide and N-vinylpyrrolidone. Particular preference is given to a copolymer of 92 to 98 wt.-% of ethyl acrylate and 2 to 8 wt.-% of methacrylamide. The agglomerating dispersion may, if desired, also contain more than one of the acrylate polymers mentioned.

In general, the concentration of the acrylate polymers in the dispersion used for agglomeration should be from 3 to 40% by weight. For the agglomeration, from 0.2 to 20 parts by weight, preferably from 1 to 5 parts by weight, of the agglomerating dispersion are used for each 100 parts of the rubber latex, the calculation in each case being based on solids. The agglomeration is carried out by adding the agglomerating dispersion to the rubber. The addition rate is usually not critical, and the addition usually takes from 1 to 30 minutes at from 20 to 90° C., preferably from 30 to 75° C.

Acrylate copolymers having a polydispersity U of less than 0.27 and a $d_{50}$ value of from 100 to 150 nm are preferably used for the agglomeration. Such acrylate copolymers are described in detail on pages 8 to 14 of WO 2014/170406.

In case of agglomeration with a dispersion of an acrylate copolymer generally the obtained graft substrate (A1) has a bimodal particle size distribution of nonagglomerated particles having a $d_{50}$ value in the range of from 80 to 120 nm and of agglomerated particles having a $d_{50}$ value in the range of 150 to 800 nm, preferably 180 to 700 nm, more preferably 200 to 600 nm, most preferred 250 to 500 nm.

In step γ) the agglomerated rubber latex (A1) is grafted to form the graft copolymer (A). Suitable grafting processes are described in detail on pages 12 to 14 of WO 2012/022710.

Graft copolymer (A) is obtained by emulsion polymerization of styrene and acrylonitrile—optionally partially replaced by alpha-methylstyrene, methyl methacrylate and/or maleic anhydride—in a weight ratio of 95:5 to 65:35 to obtain a graft sheath (A2) (in particular a graft shell) in the presence of the above-mentioned agglomerated butadiene rubber latex (A1).

Preferably graft copolymer (A) has a core-shell-structure.

The grafting process of the agglomerated rubber latex (A1) of each particle size is preferably carried out individually.

Preferably the graft polymerization is carried out by use of a redox catalyst system, e.g. with cumene hydroperoxide or tert.-butyl hydroperoxide as preferable hydroperoxides. For the other components of the redox catalyst system, any reducing agent and metal component known from literature can be used.

According to a preferred grafting process which is carried out in presence of at least one agglomerated butadiene rubber latex (A1) with a median weight particle diameter $D_{50}$ of preferably 280 to 350 nm, more preferably 300 to 330 nm, in an initial slug phase 15 to 40 wt.-%, more preferably 26 to 30 wt.-%, of the total monomers to be used for the graft sheath (A2) are added and polymerized, and this is followed by a controlled addition and polymerization of the remaining amount of monomers used for the graft sheath (A2) till they are consumed in the reaction to increase the graft ratio and improve the conversion. This leads to a low volatile monomer content of graft copolymer (A) with better impact transfer capacity.

Further details to polymerization conditions, emulsifiers, initiators, molecular weight regulators used in grafting step γ) are described in WO 2012/022710.

Component (B)

Preferably copolymer (B) (component (B)) is a copolymer of alpha-methylstyrene and acrylonitrile in a weight ratio of from 75:25 to 55:45, preferably 70:30 to 60:40, it being possible for alpha-methylstyrene and/or acrylonitrile to be partially (less than 50 wt.-%, preferably less than 20 wt.-%, more preferably less than 10 wt.-%, based on the total amount of monomers used for the preparation of (B)) replaced by methyl methacrylate, maleic anhydride and/or 4-phenylstyrene.

It is preferred that alpha-methylstyrene and acrylonitrile are not partially replaced by one of the above-mentioned comonomers. Component (B) is preferably a copolymer of alpha-methylstyrene and acrylonitrile.

Such copolymers preferably have weight average molecular weights Mw of from 20,000 to 220,000 g/mol. Their melt flow index (MFI) is preferably 5 to 9 g/10 min (measured according to ASTM D 1238 (ISO 1133:1-2011) at 220° C. and 10 kg load). Details relating to the preparation of such copolymers are described, for example, in DE-A 2 420 358, DE-A 2 724 360 and in Kunststoff-Handbuch ([Plastics Handbook], Vieweg-Daumiller, volume V, (Polystyrol [Polystyrene]), Carl-Hanser-Verlag, Munich, 1969, pp. 122 ff., lines 12 ff.).

Such copolymers prepared by mass (bulk) or solution polymerization in, for example, toluene or ethylbenzene, have proved to be particularly suitable.

Component (C)

Preferably copolymer (C) (=component (C)) is a copolymer of styrene and acrylonitrile in a weight ratio of from preferably 78:22 to 65:35, more preferably 75:25 to 70:30, most preferred 74:26 to 72:28, it being possible for styrene and/or acrylonitrile to be partially (less than 50 wt.-%, preferably less than 20 wt.-%, more preferably less than 10 wt.-%, based on the total amount of monomers used for the preparation of (B)) replaced by methyl methacrylate, maleic anhydride and/or 4-phenylstyrene.

It is preferred that styrene and acrylonitrile are not partially replaced by one of the above-mentioned comonomers. Component (C) is preferably a copolymer of styrene and acrylonitrile.

The weight average molar mass $M_w$ of copolymer (C) generally is 130,000 to 300,000 g/mol, preferably 140,000 to 220,000 g/mol, more preferably 150,000 to 200,000 g/mol.

Details relating to the preparation of such copolymers are described, for example, in DE-A 2 420 358, DE-A 2 724 360 and in Kunststoff-Handbuch ([Plastics Handbook], Vieweg-Daumiller, volume V, (Polystyrol [Polystyrene]), Carl-Hanser-Verlag, Munich, 1969, pp. 122 ff., lines 12 ff.). Such copolymers prepared by mass (bulk) or solution polymerization in, for example, toluene or ethylbenzene, have proved to be particularly suitable.

Component (D)

The terpolymers (D) suitable for use in this invention are random terpolymers comprising (consisting of) from 13 to 27 wt.-%, recurring units of an α, β ethylenically unsaturated cyclic anhydride, 60 to 74 wt.-%, recurring units of an aromatic vinyl monomer, and 13 to 27 wt.-%, recurring units of a maleimide monomer.

The terpolymers (D) suitable for use in this invention can be prepared by free radical polymerization in solution or in bulk. The monomer composition of said terpolymers is selected within the above-given ranges in such a manner that terpolymers having preferably a glass transition temperature $T_G$ in the range from 180 to 200° C., more preferably 185 to 196° C., are obtained.

The number average molecular weight ($M_n$, as measured by gel permeation chromatography vs. monodisperse polystyrene) of said terpolymers is preferably from 50,000 to 300,000, more preferably 150,000 to 250,000.

Suitable aromatic vinyl monomers include styrene, a-methylstyrene, ethylstyrene, isopropylstyrene, t-butyl styrene, mono-, di- and tribromostyrenes, mono-, di- and trichlorostyrenes and their mixtures. Styrene is the preferred aromatic vinyl monomer.

Suitable maleimide monomers include maleimide, N-phenylmaleimide, N-ethylmaleimide, N-(2-chlorophenyl)maleimide, N-(3-chlorophenyl)maleimide), N-(4-chlorophenyl) maleimide, N-(4-bromophenyl)maleimide, N-(2,4,6-tribromophenyl)maleimide, N-methylmaleimide, N-(4-t-butylphenyl)maleimide and the like and their mixtures. Preferred maleimides are N-substituted maleimides, more preferred N-aryl maleimides, most preferred is N-phenylmaleimide.

Suitable α, β ethylenically unsaturated cyclic anhydrides include maleic anhydride, citraconic and itaconic anhydride. The preterred anhydride is maleic anhydride.

Preferably component (D) is a terpolymer comprising (consisting of) recurring units of maleic anhydride, styrene, and N-phenyl maleimide. Suitable terpolymers (D) for use in accordance with the invention are commercially available from Denka Company, Japan as Denka IP grades MS-NI, MS-NIP, MS-NJ and MS-NJP.

Component (E)

Suitable elastomeric block copolymers (E) comprise (or consist of) at least one block S which forms a hard phase and incorporates units of a vinylaromatic monomer, and at least one elastomeric block B/S which forms a soft phase and incorporates both units of a vinylaromatic monomer and of a conjugated diene, where S is the vinylaromatic block and B/S is the soft phase, wherein the block is built up randomly from diene units and vinylaromatic units, and where the glass transition temperature Tg of the block S is above 25° C., and that of the block B/S is below 25° C., and the phase volume ratio of block S to block B/S is selected so that the proportion of hard phase in the entire block copolymer is from 1 to 40% by volume and the proportion of the diene is less than 50% by weight, based on the entire block copolymer (E).

Such an elastomeric block copolymer is obtained if, within the above parameters, the soft phase is formed from a random copolymer of a vinylaromatic with a diene; random copolymers of vinylaromatics and dienes can be obtained by polymerization in the presence of a polar cosolvent.

Block copolymer E can be represented, for example, by one of the formulae 1 to 12:

(1) S-B/S-S;
(2) (S-B/S)n;
(3) (S-B/S)n-S;
(4) B/S-(S-B/S)n;
(5) X-[(S-B/S)n]m+1;
(6) X-[(B/S-S)n]m+1;
(7) X-[(S-B/S)n-S]m+1;
(8) X-[(B/S-S)n-B/S]m+1;
(9) Y-[(S-B/S)n]m+1;
(10) Y-[(B/S-S)n]m+1;
(11) Y-[(S-B/S)n-S]m+1;
(12) Y-[(B/S-S)n-B/S]m+1;

where S is the hard phase and B/S is the soft phase, ie. the block built up randomly from diene units and vinylaromatic monomer units, X is the radical of an n-functional initiator, Y is the radical of an m-functional coupling agent and m and n are natural numbers from 1 to 10.

Styrene, α-methylstyrene, p-methylstyrene, ethylstyrene, tert-butylstyrene, vinyltoluene or mixtures thereof can be used as vinylaromatic monomers both for the hard blocks S and for the soft blocks B/S. Styrene is preferably used.

Butadiene, isoprene, 2,3-dimethylbutadiene, 1,3-pentadiene, 1,3-hexadienes or piperylene or mixtures thereof are preferably used as dienes for the soft block B/S. 1,3-butadiene is particularly preferably used.

A preferred block copolymer (E) is one of the general formulae S-(B/S)-S, X-[-(B/S)-S]$_2$ and Y-[-(B/S)-S]$_2$ (for the meanings of abbreviations, see above) and a particularly preferred block copolymer is one whose soft phase is divided into blocks (B/S)$_1$ -(B/S)$_2$; (B/S)$_1$ -(B/S)$_2$ -(B/S)$_1$ and (B/S)$_1$ -(B/S)$_2$ -(B/S)$_3$; whose vinylaromatic/diene ratio differs in the individual blocks B/S or changes continuously within a block within the limits (B/S)$_1$ (B/S)$_2$, the glass transition temperature $T_g$ of each sub-block being below 25° C.

A block copolymer which has a plurality of blocks B/S and/or S having different molecular weights per molecule is likewise preferred.

A particularly preferred combination of monomers is butadiene and styrene.

Preferably the B/S block is composed of 75 to 30% by weight of vinylaromatic monomer, preferably styrene, and 25 to 70% by weight of diene, preferably butadiene.

More preferably the B/S block has a diene, in particular butadiene, content of from 35 to 70 wt.-% and a vinylaromatic monomer, in particular styrene, content of from 65 to 30 wt.-%.

Preferred are block copolymers (E) made from a monomer composition consisting of 25 to 39% by weight of diene, in particular butadiene, and 75 to 61% by weight of the vinylaromatic monomer, in particular styrene.

The block copolymers (E) are generally prepared by anionic polymerization in a nonpolar solvent with the addition of a polar cosolvent (see WO 95/35335, pages 5-6). The concept here is that the cosolvent acts as a Lewis base toward the metal cation. Preferably used solvents are aliphatic hydrocarbons, such as cyclohexane or methylcyclohexane. Polar aprotic compounds, such as ethers and tertiary amines, are preferred as Lewis bases. Examples of particularly effective ethers are tetrahydrofuran and aliphatic polyethers, such as diethylene glycol dimethyl ether. Examples of tertiary amines are tributylamine and pyridine. The polar cosolvent is added to the nonpolar solvent in a small amount, for example 0.5-5% by volume. Tetrahydrofuran in an amount of 0.1-0.3% by volume is particularly preferred. Experience has shown that an amount of about 0.2% by volume is sufficient in most cases.

The copolymerization parameters and the amount of 1,2- and 1,4-bonds of the diene units are determined by the metering and structure of the Lewis base. The polymers contain, for example, 15-40% of 1,2-bonds and 85-60% of 1,4-bonds, based on all diene units.

The anionic polymerization is initiated by means of organometallic compounds. Compounds of the alkali metals, particularly lithium, are preferred. Examples of initiators are methyllithium, ethyllithium, propyllithium, n-butyllithium, sec-butyllithium and tertbutyllithium. The organometallic compound is added as a solution in a chemically inert hydrocarbon. The amount metered depends on the desired molecular weight of the polymer but is as a rule from 0.002 to 5 mol %, based on the monomers.

The polymerization temperature may be from 0 to 130° C., preferably from 30 to 100° C.

The amount by volume of the flexible phase in the solid is of decisive importance for the mechanical properties.

The amount by volume of the soft phase B/S composed of diene and vinylaromatic sequences is 60 to 95, preferably 70 to 90, particularly preferably 80 to 90, % by volume.

The blocks S formed from the vinylaromatic monomers constitute the hard phase, which accounts for 5 to 40, preferably 10 to 30, particularly preferably 10 to 20, % by volume.

It should be pointed out that there is no strict correlation between the abovementioned ratios of vinylaromatic monomer and diene, the abovementioned limits of the phase volumes and the composition which arises from the ranges of the glass transition temperature, since the relevant numbers in each case are numerical values rounded up to the nearest tens unit. Any correlation is likely to be merely accidental.

The volume fraction of the two phases can be measured by means of high-contrast electron microscopy or solid-state NMR spectroscopy. The amount of vinylaromatic blocks can be determined by precipitation and weighing following osmium degradation of the polydiene content. The future phase ratio of a polymer can also be calculated from the amounts of monomers used if polymerization is taken to completion every time.

In addition, it is to be pointed out (cf. J. Brandrup, E. H. Immergut, Polymer Handbook, John Wiley, N.Y.) that the densities of styrene/butadiene copolymers can be calculated approximately from the mass fractions of the monomers; thus, the density of polybutadiene (obtained by anionic polymerization) is 0.895 g/ml and the density of polystyrene is about 1.05 g/ml (mean value), whereas the density is stated as 0.933 for a styrene/butadiene copolymer (SB rubber) containing 23.5% of styrene. The calculated density would be 0.960.

The block copolymer (E) is unambiguously defined by the quotient of the volume fraction as a percentage of the soft phase formed from the B/S blocks and the fraction of diene units in the soft phase, which is from 25 to 70% by weight.

The glass transition temperature ($T_g$) is influenced by the random incorporation of vinylaromatic monomers in the soft block B/S of the block copolymer and the use of Lewis bases during the polymerization. A glass transition temperature of from −50 to +25 C, preferably from −50 to +5° C. is typical.

The molecular weight of block S is in general from 1000 to 200,000, preferably from 3000 to 80,000, g/mol. Within a molecule, S blocks may have different molecular weights.

The molecular weight of block B/S is usually from 2000 to 250,000, preferably from 5000 to 150,000, g/mol. As in the case of block S, block B/S too may assume different molecular weight values within a molecule.

The coupling center X is formed by the reaction of the living anionic chain ends with a bifunctional or polyfunctional coupling agent. Examples of such compounds are given in U.S. Pat. Nos. 3,985,830, 3,280,084, 3,637,554 and 4,091,053. For example, epoxidized glycerides, such as epoxidized linseed oil or soybean oil, are preferably used; divinylbenzene is also suitable. Dichlorodialkylsilanes, dialdehydes, such as terephthalaldehyde, and esters, such as ethyl formate or ethyl benzoate, are particularly suitable for the dimerization.

Preferred polymer structures are S-(B/S)-S, X-[-(B/S)-S]$_2$ and Y-[-(B/S)-S]$_2$, where the random block B/S itself may in turn be divided into blocks B1/S1-B2/S2-B3/S3- . . . . The random block preferably consists of from 2 to 15, particularly preferably from 3 to 10, random subblocks. The division of the random block B/S into as many subblocks Bn/Sn as possible has the decisive advantage that the B/A block as a whole behaves like a virtually perfect random polymer even in the case of a composition gradient within a subblock Bn/Sn.

Particular preference is given to linear styrene-butadiene block copolymers of the general structure S-(S/B)-S having, situated between the two S blocks, one or more (S/B)-random blocks having random styrene/butadiene distribution. These block copolymers are described by way of example in WO 95/35335 and WO 97/40079.

The vinyl content is the relative proportion of 1,2-linkages of the diene units, based on the entirety of 1,2-, 1,4-cis and 1,4-trans linkages. The 1,2-vinyl content in the styrene-butadiene copolymer block (S/B) is preferably below 20%, in particular in the range from 9 to 15%, particularly preferably in the range from 9 to 12%. Suitable block copolymers C having such a 1,2-vinyl content in the styrene-butadiene copolymer block (S/B) are described in detail in WO 97/40079. Such a preferred elastomeric block copolymer having less tendency to crosslink is obtained if, within the above parameters, the soft phase is formed from a random copolymer of a vinylaromatic with a diene; random copolymers of vinylaromatics and dienes are obtained by polymerization in the presence of a potassium salt soluble in nonpolar solvents. The random copolymerization of styrene and butadiene in cyclohexane in the presence of soluble potassium salts is described by S. D. Smith, A. Ashraf et al. in Polymer Preprints 34(2) (1993), 672, and 35(2) (1994), 466.

Potassium 2,3-dimethyl-3-pentanolate and potassium 3-ethyl-3-pentanolate are mentioned as soluble potassium salts. When the amount of potassium salt required for strictly random copolymerization of, for example, styrene and butadiene is added, the relative proportion of the 1,2-vinyl structure remains below 15%, in an advantageous case below about 11-12%, based on the sum of 1,2-vinyl and 1,4-cis/trans microstructure. In the case of butyllithium-initiated polymerization in cyclohexane, the molar ratio of lithium to potassium in this case is from about 10:1 to 40:1. If a composition gradient (ie. a composition changing more or less fluently from butadiene to styrene) is desired along the random block, Li/K ratios greater than 40:1 should be chosen, and ratios of less than 10:1 in the case of a gradient from styrene to butadiene.

The random blocks of the block copolymers, which blocks simultaneously contain vinylaromatic and diene, are preferably prepared with the addition of a soluble potassium salt, in particular of a potassium alcoholate. It is believed that the potassium salt undergoes metal exchange with the lithium-carbanion ion pair, potassium carbanions being formed and preferably undergoing an addition reaction with styrene, while lithium cabanions preferably undergo an addition reaction with butadiene. Because potassium carbanions are substantially more reactive, a small fraction, ie. from 1/10 to 1/40, is sufficient on average, together with the predominant lithium carbanions, to make the incorporation of styrene and butadiene equally probable. Furthermore, it is believed that metal exchange frequently occurs between the living chains and between a living chain and the dissolved salt during the polymerization process, so that the same chain preferably undergoes addition with styrene on the one hand and then with butadiene on the other hand. Consequently, the copolymerization parameters are then virtually the same for styrene and butadiene. Particularly suitable potassium salts are potassium alcoholates, in this case in particular tertiary alcoholates of at least 7 carbon atoms. Typical corresponding alcohols are, for example, 3-ethyl-3-pentanol and 2,3-dimethyl-3-pentanol. Tetrahydrolinalool (3,7-dimethyl-3-octanol) has proven particularly suitable. In addition to the potassium alcoholates, other potassium salts which are inert to metal alkyls are in principle also suitable. Examples of these are dialkyl potassium amides, alkylated diaryl potassium amides, alkyl thiolates and alkylated aryl thiolates.

The time when the potassium salt is added to the reaction medium is important. Usually, at least parts of the solvent and the monomer for the first block are initially taken in the reaction vessel. It is not advisable to add the potassium salt at this time as it is at leas partially hydrolyzed to KOH and alcohol by traces of protic impurities. The potassium ions are then irreversibly deactivated for the polymerization. The lithium organyl should therefore be added first and mixed in before the potassium salt is added.

If the first block is a homopolymer, it is advisable to add the potassium salt only shortly before the polymerization of the random block.

The potassium alcoholate can readily be prepared from the corresponding alcohol by stirring a cyclohexane solution in the presence of excess potassium-sodium alloy. After 24 hours at 25° C., the devolution of hydrogen and hence the reaction are complete. However, the reaction can also be shortened to a few hours by refluxing at 80° C. An alternative reaction involves adding a small excess of potassium methylate, potassium ethylate or potassium tert-butylate to the alcohol in the presence of a high-boiling inert solvent, such as decalin or ethylbenzene, distilling off the low-boiling alcohol, in this case methanol, ethanol or tert-butanol, diluting the residue with cyclohexane and filtering off the solution from excess sparingly soluble alcoholate.

Preferred block copolymers A according to the present invention are linear styrene-butadiene block copolymers of the general structure S-(S/B)-S having, situated between the two S blocks, one or more (S/B)-random blocks having random styrene/butadiene distribution, and a 1,2-vinyl content in the styrene-butadiene copolymer block (S/B) of below 20%.

Further preferred block copolymers (E) have a star-shaped molecular architecture, where the star-shaped molecular architecture has at least two different arms of the star, having the structure of the following general formulae:

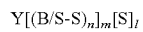

$Y[(B/S-S)_n]_m[S]_l$

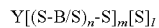

$Y[(S-B/S)_n-S]_m[S]_l$ where S B/S n and m have the meaning given above, Y is the moiety of an (m+l)-functional coupling agent, and l is a natural number from 1 to 10. Said star shaped block copolymers C are described in detail in WO 2012/055919.

Suitable and preferred block copolymers (E) are commercially available as Styroflex® 2G66 and—in case component (E) is totally replaced by component (E')-K-resin® KR 20 from Ineos Styrolution, Germany.

Component (E')

Elastomeric block copolymer (E') (=component (E')) is at least one, preferably one, coupled conjugated diene/monovinylarene block copolymer comprising one or more conjugated diene/monovinylarene tapered polymer blocks, where—in the final block copolymer—all conjugated diene is incorporated into the tapered blocks, and—based on the total weight of the final block copolymer—the monovinylarene is present in an amount of 55 to 80 wt.-%, and the conjugated diene is present in an amount of 20 to 45 wt.-%.

Preferably component (E') is a coupled conjugated diene/monovinylarene block copolymer comprising at least three consecutive conjugated diene/monovinylarene tapered polymer blocks.

As used herein, consecutive means three sequential tapered polymer blocks with no intervening homopolymer blocks. As mentioned above the tapered polymer blocks contain a mixture of monovinylarene and conjugated diene.

The basic starting materials and polymerization conditions for preparing conjugated diene/monovinylarene block copolymer are disclosed in U.S. Pat. Nos. 4,091,053; 4,584,346; 4,704,434; 4,704,435; 5,227,419 and 6,096,828.

Suitable conjugated dienes which can be used in the elastomeric block copolymers E' include those having 4 to 12 carbon atoms per molecule, with those having 4 to 8 carbon atoms preferred. Examples of such suitable compounds include 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. The preferred dienes are 1,3-butadiene and isoprene, more preferably 1,3-butadiene.

Suitable monovinylarene compounds which can be used in the block copolymers include those having 8 to 18 carbon atoms per molecule, preferably 8 to 12 carbon atoms. Examples of such suitable compounds include styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. Styrene is the preferred monovinylarene compound.

Generally the monovinylarene monomer is present in the final block copolymer in an amount of from 55 to 80 weight percent based on the total weight of the final block copolymer, preferably 60 to 70 weight percent, and more preferably 61 to 64 weight percent.

Generally the conjugated diene monomer is present in the final block copolymer in an amount of from 20 to 45 weight percent based on the total weight of the final block copolymer, preferably 30 to 40 weight percent, and more preferably 36 to 39 weight percent.

Preferably the block polymer contains at least three consecutive conjugated diene/monovinylarene tapered polymer blocks, which are incorporated sequentially into the block copolymer with no intervening homopolymer blocks.

The amount of each monomer in the tapered polymer block can vary broadly depending on the particular characteristics desired. Generally monovinylarene will be present in each tapered polymer block in an amount of from 2 to 18 weight percent based on the total weight of the final block copolymer, preferably from 3 to 16 weight percent.

Generally the conjugated diene will be present in each tapered polymer block in an amount of from 8 to 17 weight percent based on the total weight of the final block copolymer, preferably from 9 to 16 weight percent.

All conjugated diene monomer present in the final block copolymer is incorporated into the tapered polymer blocks.

The relative amount of each monomer in the tapered polymer block can also vary broadly depending on the particular characteristics desired. Preferably the conjugated diene will be present in each tapered polymer block in an amount of from 0.6 parts to 4 parts per part monovinylarene in the tapered polymer block, more preferably from about 0.7 parts to about 3.5 parts per part monovinylarene.

The monomer and monomer mixtures are copolymerized sequentially in the presence of an initiator. The initiators can be any of the organomonoalkali metal compounds known for such purposes. Preferably employed are compounds of the formula RM, wherein R is an alkyl, cycloalkyl, or aryl radical containing 4 to 8 carbon atoms, more preferably R is an alkyl moiety. M is an alkali metal, preferably lithium. The presently preferred initiator is n-butyl lithium.

The amount of initiator employed depends upon the desired polymer or incremental block molecular weight, as is known in the art, and is readily determinable, making due allowance for traces of poisons in the feed streams. Generally the initiator will be present in an amount in the range of from about 0.01 phm (parts by weight per hundred parts by weight of total monomer) to about 1.0 phm, preferably about 0.01 phm to about 0.5 phm, and more preferably from 0.01 phm to 0.2 phm.

Small amounts of polar organic compounds, such as ethers, thioethers, and tertiary amines can be employed in the hydrocarbon diluent to improve the effectiveness of the initiator. Tetrahydrofuran is currently preferred. When employed, the polar organic compound is present in an amount sufficient to improve the effectiveness of the initiator. For example, when employing tetrahydrofuran to improve the effectiveness of the initiator, the tetrahydrofuran is generally present in an amount in the range of from 0.01 to 1.0 phm, preferably from 0.02 to 1.0 phm.

The polymerization process is carried out in a hydrocarbon diluent at any suitable temperature in the range of from −100° C. to 150° C., preferably from 0° C. to 150° C., at pressures sufficient to maintain the reaction mixture substantially in the liquid phase. Preferred hydrocarbon diluents include linear or cycloparaffins or mixtures thereof. Typical examples include pentane, hexane, octane, cyclopentane, cyclohexane, and mixtures thereof. Cyclohexane is presently preferred. The polymerization is carried out in a substantial absence of oxygen and water, preferably under an inert gas atmosphere.

Each monomer charge or monomer mixture charge is polymerized under solution polymerization conditions such that the polymerization of each monomer charge or monomer mixture charge is substantially complete before charging a subsequent charge.

Typical initiator, monomer and monomer mixture charge sequences include, but are not limited to the following:

Mode A
(a) monovinylarene monomer and initiator,
(b) monovinylarene monomer and initiator,
(c) conjugated diene/monovinylarene monomer mixture, and
(d) coupling agent;

Mode B
(a) monovinylarene monomer and initiator,
(b) monovinylarene monomer and initiator,
(c) conjugated diene/monovinylarene monomer mixture,
(d) conjugated diene/monovinylarene monomer mixture, and
(e) coupling agent;

Mode C
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture, and
(f) coupling agent;

Mode D
(a) monovinylarene monomer and initiator,
(b) monovinylarene monomer and initiator, (c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture, and
(g) coupling agent;
Mode E
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture,
(g) conjugated diene/monovinylarene monomer mixture, and
(h) coupling agent.
Mode F
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture, and
(e) coupling agent;
Mode G
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture,
(e) conjugated diene/monovinylarene monomer mixture, and
(f) coupling agent;
Mode H
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture, and
(g) coupling agent.

The monomer mixture can be premixed and charged as a mixture or the monomers can be charged simultaneously. In step (a) the initiator can be added before or after the monovinylarene monomer charge. In large scale operations it may be desirable to add the monovinylarene monomer before adding the initiator in step (a). In subsequent steps containing initiator, the initiator should be added prior to the monomer or monomer mixture.

Prior to coupling, typical polymer chains prepared by the above described sequential polymerizations include the following:
Mode A
S1-S2-B1/S3-Li
S2-B1/S3-Li
Mode B
S1-S2-B1/S3-B2/S4-Li
S2-B1/S3-B2/S4-Li
Mode C
S1-S2-B1/S3-B2/S4-B3/S5-Li
S2-B1/S3-B2/S4-B3/S5-Li
Mode D
S1-S2-B1/S3-B2/S4-B3/S5-B4/S6-Li
S2-B1/S3-B2/S4-B3/S5-B4/S6-Li
Mode E
S1-S2-B1/S3-B2/S4-B3/S5-B4/S6-B5/S7-Li
S2-B1/S3-B2/S4-B3/S5-B4/S6-B5/S7-Li
Mode F
S1-B1/S2-B2/S3-B3/S4-Li
B1/S2-B2/S3-B3/S4-Li
Mode G
S1-B1/S2-B2/S3-B3/S4-B4/S5-Li
B1/S2-B2/S3-B3/S4-B4/S5-Li
Mode H
S1-B1/S2-B2/S3-B3/S4-B4/S5-B5/S6-Li
B1/S2-B2/S3-B3/S4-B4/S5-B5/S6-Li where S1 and S2 are monovinylarene blocks, blocks B1/S2, B2/S3 etc. are tapered blocks containing a mixture of monovinylarene and conjugated diene, and Li is a residue from a monoalkali metal initiator.

Preferably polymer chains
(X) S1-S2-B1/S3-B2/S4-B3/S5-Li
(Y) S2-B1/S3-B2/S4-B3/S5-Li
according to Mode C are prepared.

In particular preferred block copolymer (E') comprises (or consists of) at least one polymer chain (X') of the formula S1-S2-B1/S3-B2/S4-B3/S5~, wherein S1, S2, B1/S3, B2/S4, B3/S5 are as hereinbefore defined and ~ is the bond to the coupling agent.

In formulas (X) and (Y), the total weight of blocks $S^1$ and $S^2$ can be from 30 wt. % to 70 wt. % (or preferably from 35 wt. % to 65 wt. %) of X, and $S^2$ can be from 15 wt. % to 45 wt. % (or preferably from 17 wt. % to 40 wt. %) of Y.

The number average molecular weight Mn of the polymer chain (X) or (X')—before coupling—is preferably 65.000 to 100.000 g/mol.

The number average molecular weight Mn of block S1 of the polymer chain (X) is preferably 20.000 to 40.000 g/mol.

The number average molecular weight Mn of block S2 of the polymer chain (X) is preferably 10.000 to 20.000 g/mol.

The number average molar mass $M_n$ is determined by GPC (solvent: tetrahydrofuran, polystyrene as polymer standard) with UV detection according to DIN 55672-1:2016-03.

The coupling agent is added after polymerization is complete. Suitable coupling agents include the di- or multivinylarene compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, di-, or multiesters, preferably the esters of monoalcohols with polycarboxylic acids, diesters which are esters of monohydric alcohols with dicarboxylic acids, diesters which are esters of monobasic acids with polyalcohols such as glycerol, and the like, and mixtures of two or more such compounds.

Useful multifunctional coupling agents include epoxidized vegetable oils such as epoxidized soybean oil, epoxidized linseed oil and the like or mixtures thereof. The presently preferred coupling agent is epoxidized vegetable oil. Presently preferred is epoxidized soybean oil.

Any effective amount of the coupling agent can be employed. While the amount is not believed to be critical, generally a stoichiometric amount relative to the active polymer alkali metal tends to promote maximum coupling. However, more or less than stoichiometric amounts can be used for varying coupling efficiency where desired for particular products. Typically the total amount of coupling agent employed in the polymerization is in the range of from about 0.1 phm to about 20 phm, preferably from about 0.1 phm to about 5 phm, and more preferably 0.1 phm to 2 phm.

Following completion of the coupling reaction, the polymerization reaction mixture can be treated with a terminating agent such as water, alcohol, phenols or linear saturated aliphatic mono-dicarboxylic acids to remove alkali metal from the block copolymer and for color control. The preferred terminating agent is water and carbon dioxide.

The polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

Suitable and preferred block copolymers (E') are commercially available as K-resin® KR 20 from Ineos Styrolution, Germany.

Component (F)

Various additives and/or processing aids (F) (=component (F)) may be added to the molding compounds according to the invention in amounts of from 0.01 to 5 wt.-% as assistants and processing additives. Suitable additives and/or processing aids (F) include all substances customarily employed for processing or finishing the polymers.

Examples include, for example, dyes, pigments, colorants, fibers/fillers, antistats, antioxidants, stabilizers for improving thermal stability, stabilizers for increasing photostability, stabilizers for enhancing hydrolysis resistance and chemical resistance, antithermal decomposition agents, dispersing agents, and in particular external/internal lubricants that are useful for production of molded bodies/articles.

These additives and/or processing aids may be admixed at any stage of the manufacturing operation, but preferably at an early stage in order to profit early on from the stabilizing effects (or other specific effects) of the added substance.

Preferably component (F) is at least one lubricant, antioxidant and/or pigment.

Suitable lubricants/glidants and demolding agents include stearic acids, stearyl alcohol, stearic esters, amide waxes (bisstearylamide, in particular ethylenebisstearamide), polyolefin waxes and/or generally higher fatty acids, derivatives thereof and corresponding fatty acid mixtures comprising 12 to 30 carbon atoms.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof.

It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use so-called costabilizers, in particular phosphorus- or sulfur-containing costabilizers. These phosphorus- or sulfur-containing costabilizers are known to those skilled in the art.

For further additives and/or processing aids, see, for example, "Plastics Additives Handbook", Ed. Gächter and Müller, 4th edition, Hanser Publ., Munich, 1996.

Specific examples of suitable additives and/or processing aids are mentioned on pages 23 to 26 of WO 2014/170406.

Preparation of Thermoplastic Molding Composition

The thermoplastic molding composition of the invention may be produced from the components (A), (B), (C), (D), (E) and, if present (F), and optionally further polymers (TP) by any known method. However, it is preferable when the components are pre-mixed and blended by melt mixing, for example conjoint extrusion, preferably with a twin-screw extruder, kneading or rolling of the components. This is done at temperatures in the range of from 160° C. to 400° C., preferably from 180° C. to 280° C., more preferably 220° C. to 250° C. In a preferred embodiment, the component (A) is first partially or completely isolated from the aqueous dispersion obtained in the respective production steps. For example, the graft copolymers (A) may be mixed as a moist or dry crumb/powder (for example having a residual moisture of from 1 to 40%, in particular 20 to 40%) with the other components, complete drying of the graft copolymers (A) then taking place during the mixing. The drying of the particles may also be performed as per DE-A 19907136.

The aforementioned also applies to thermoplastic molding compositions according to the invention produced from components (A), (B), (C), (D), (E') and, if present (F), and optionally further polymers (TP).

The thermoplastic molding compositions according to the invention have an excellent high heat resistance along with good mechanical properties, in particular an enhanced impact strength. Furthermore, the thermoplastic molding compositions can be processed easily due to an improved melt flow rate (MFI).

The invention further provides for the use of the inventive thermoplastic molding composition for the production of shaped articles.

Processing may be carried out using the known processes for thermoplast processing, in particular production may be effected by thermoforming, extruding, injection molding, calendaring, blow molding, compression molding, press sintering, deep drawing or sintering; injection molding is preferred.

Preferred is the use of the thermoplastic molding composition according to the invention for applications in the automotive, household and healthcare sector and in the electronics industry. In particular preferred is the use in the automotive sector for exterior and interior applications.

The invention is further illustrated by the examples and the claims.

EXAMPLES

Test Methods

Particle Size $Dw/D_{50}$

For measuring the weight average particle size Dw (in particular the median weight particle diameter D50) with the disc centrifuge DC 24000 by CPS Instruments Inc. equipped with a low density disc, an aqueous sugar solution of 17.1 mL with a density gradient of 8 to 20% by wt. of saccharose in the centrifuge disc was used, in order to achieve a stable flotation behavior of the particles. A polybutadiene latex with a narrow distribution and a mean particle size of 405 nm was used for calibration. The measurements were carried out at a rotational speed of the disc of 24,000 r.p.m. by injecting 0.1 mL of a diluted rubber dispersion into an aqueous 24% by wt. saccharose solution. The calculation of the weight average particle size Dw was performed by means of the formula $$D_w = \mathrm{sum}(n_i * d_i^4)/\mathrm{sum}(n_i * d_i^3)$$

$n_i$: number of particles of diameter $d_i$.

Molar Mass $M_w$

The weight average molar mass $M_w$ is determined by GPC (solvent: tetrahydrofuran, polystyrene as polymer standard) with UV detection according to DIN 55672-1:2016-03.

Tensile Strength (TS) and Tensile Modulus (TM) Test

Tensile test (ASTM D 638) of ABS blends was carried out at 23° C. using a Universal testing Machine (UTM) of Lloyd Instruments, UK.

Flexural Strength (FS) and Flexural Modulus (FM) Test

Flexural test of ABS blends (ASTM D 790 standard) was carried out at 23° C. using a UTM of Lloyd Instruments, UK.

Notched Izod Impact Strength (NIIS) Test

Izod impact tests were performed on notched specimens (ASTM D 256 standard) using an instrument of CEAST (part of Instron's product line), Italy.

Heat Deflection Temperature (HDT)

Heat deflection temperature test was performed on injection molded specimen (ASTM D 648 standard) using a CEAST, Italy instrument.

VICAT Softening Temperature (VST)

Vicat softening temperature test was performed on injection molded test specimen (ASTM D 1525-09 standard) using a CEAST, Italy machine. Test is carried out at a heating rate of 120° C./hr (Method B) at 50 N loads.

Rockwell Hardness (RH)

Hardness of the injection molded test specimen (ISO-2039/2-11) was tested using a Rockwell hardness tester.

Melt Flow Index (MFI) or Melt Volume Flow Rate (MFR)

MFI/MFR test was performed on ABS pellets (ISO 1133 standard, ASTM 1238, 220° C./10 kg load) using a MFI-machine of CEAST, Italy.

Materials used:

Component (A)

Fine-Particle Butadiene Rubber Latex (S-A1)

The fine-particle butadiene rubber latex (S-A1) which is used for the agglomeration step was produced by emulsion polymerization using tert-dodecylmercaptan as chain transfer agent and potassium persulfate as initiator at temperatures from 60° to 80° C. The addition of potassium persulfate marked the beginning of the polymerization. Finally the fine-particle butadiene rubber latex (S-A1) was cooled below 50° C. and the non reacted monomers were removed partially under vacuum (200 to 500 mbar) at temperatures below 50° C. which defines the end of the polymerization.

Then the latex solids (in % per weight) were determined by evaporation of a sample at 180° C. for 25 min. in a drying cabinet. The monomer conversion is calculated from the measured latex solids. The butadiene rubber latex (S-A1) is characterized by the following parameters, see table 1.

Latex S-A1-1

No seed latex is used. As emulsifier the potassium salt of a disproportionated rosin (amount of potassium dehydroabietate: 52 wt.-%, potassium abietate: 0 wt.-%) and as salt tetrasodium pyrophosphate is used.

TABLE 1

Composition of the butadiene rubber latex S-A1

| Latex | S-A1-1 |
|---|---|
| Monomer butadiene/styrene | 90/10 |
| Seed Latex (wt. -% based on monomers) | ./. |
| Emulsifier (wt. -% based on monomers) | 2.80 |
| Potassium Persulfate (wt. -% based on monomers) | 0.10 |

TABLE 1-continued

Composition of the butadiene rubber latex S-A1

| Latex | S-A1-1 |
|---|---|
| Decomposed Potassium Persulfate (parts per 100 parts latex solids) | 0.068 |
| Salt (wt. -% based on monomers) | 0.559 |
| Salt amount relative to the weight of solids of the rubber latex | 0.598 |
| Monomer conversion (%) | 89.3 |
| Dw (nm) | 87 |
| pH | 10.6 |
| Latex solids content (wt. -%) | 42.6 |
| K | 0.91 |

$K = W * (1 - 1.4 * S) * Dw$

W=decomposed potassium persulfate [parts per 100 parts rubber]

S=salt amount in percent relative to the weight of solids of the rubber latex

Dw=weight average particle size (=median particle diameter $D_{50}$) of the fine-particle butadiene rubber latex (S-A1)

Production of the Coarse-Particle, Agglomerated Butadiene Rubber Latices (A1)

The production of the coarse-particle, agglomerated butadiene rubber latices (A1) was performed with the specified amounts mentioned in table 2. The fine-particle butadiene rubber latex (S-A1) was provided first at 25° C. and was adjusted if necessary with de-ionized water to a certain concentration and stirred. To this dispersion an amount of acetic anhydride based on 100 parts of the solids from the fine-particle butadiene rubber latex (S-A1) as fresh produced aqueous mixture with a concentration of 4.58 wt.-% was added and the total mixture was stirred for 60 seconds. After this the agglomeration was carried out for 30 minutes without stirring. Subsequently KOH was added as a 3 to 5 wt.-% aqueous solution to the agglomerated latex and mixed by stirring. After filtration through a 50 μm filter the amount of coagulate as solid mass based on 100 parts solids of the fine-particle butadiene rubber latex (S-A1) was determined. The solid content of the agglomerated butadiene rubber latex (A), the pH value and the median weight particle diameter $D_{50}$ was determined.

TABLE 2

Production of the coarse-particle, agglomerated butadiene rubber latices (A1)

| latex A1 | | A1-1 | A1-2 |
|---|---|---|---|
| used latex S-A1 | | S-A1-1 | S-A1-1 |
| concentration latex S-A1 before agglomeration | wt. -% | 37.4 | 37.4 |
| amount acetic anhydride | parts | 0.90 | 0.91 |
| amount KOH | parts | 0.81 | 0.82 |
| concentration KOH solution | wt. -% | 3 | 3 |
| solid content latex A1 | wt. -% | 32.5 | 32.5 |
| coagulate | parts | 0.01 | 0.00 |
| pH | | 9.0 | 9.0 |
| $D_{50}$ | nm | 315 | 328 |

Production of the Graft Copolymers (A)

59.5 wt.-parts of mixtures of the coarse-particle, agglomerated butadiene rubber latices A1-1 and A1-2 (ratio 50:50, calculated as solids of the rubber latices (A1)) were diluted with water to a solid content of 27.5 wt.-% and heated to 55° C. 40.5 wt.-parts of a mixture consisting of 72 wt.-parts styrene, 28 wt.-parts acrylonitrile and 0.4 wt.-parts tert-dodecylmercaptan were added in 3 hours 30 minutes.

At the same time when the monomer feed started the polymerization was started by feeding 0.15 wt.-parts cumene hydroperoxide together with 0.57 wt.-parts of a potassium salt of disproportionated rosin (amount of potassium dehydroabietate: 52 wt.-%, potassium abietate: 0 wt.-%) as aqueous solution and separately an aqueous solution of 0.22 wt.-parts of glucose, 0.36 wt.-% of tetrasodium pyrophosphate and 0.005 wt.-% of iron-(II)-sulfate within 3 hours 30 minutes.

The temperature was increased from 55 to 75° C. within 3 hours 30 minutes after start feeding the monomers. The polymerization was carried out for further 2 hours at 75° C. and then the graft rubber latex (=graft copolymer A) was cooled to ambient temperature. The graft rubber latex was stabilized with ca. 0.6 wt.-parts of a phenolic antioxidant and precipitated with sulfuric acid, washed with water and the wet graft powder was dried at 70° C. (residual humidity less than 0.5 wt.-%).

The obtained product is graft copolymer (A-I).

Component (B)

Statistical copolymer (B-I) from alphamethylstyrene and acrylonitrile with a ratio of polymerized styrene to acrylonitrile of 65:35 with a weight average molecular weight Mw of about 200,000 g/mol, a polydispersity of Mw/Mn of 2.5 and a melt volume flow rate (MVR) (220° C./10 kg load) of 6 to 7 mL/10 minutes, produced by free radical solution polymerization.

Component (C)

Statistical copolymer (C-I) from styrene and acrylonitrile with a ratio of polymerized styrene to acrylonitrile of 72:28 with a weight average molecular weight Mw of 185,000 g/mol, a polydispersity of Mw/Mn of 2.5 and a melt volume flow rate (MVR) (220° C./10 kg load) of 6 to 7 mL/10 minutes, produced by free radical solution polymerization.

Component (D)

D-I: Denka IP grade MS-NJP (styrene-N-phenylmaleimide-maleic anhydride-terpolymer, $T_G$ 185° C.) obtained from Denka Company, Japan.

Component (E')

E'-1: K-resin® KR 20 (styrene butadiene block copolymer) from Ineos Styrolution, Germany.

Component (F)

| F-1 | Penta erythritol tetra stearate (PETS) |
| F-2 | Magnesium stearate |
| F-3 | Magnesium oxide |
| F-4 | Distearyl pentaeritritol diphosphite (SPEP) |
| F-5 | Carbon black master batch PLASBLAK® SA 3176 from Cabot Corporation, USA |

Thermoplastic Compositions

Graft rubber polymer (A-I), AMSAN-copolymer (B-I), SAN-copolymer (C-I), terpolymer (D-I), component (E'-1), and the afore-mentioned components (F) were mixed (composition see Table 3, batch size 5 kg) for 2 minutes in a high speed mixer to obtain good dispersion and a uniform premix and then said premix was melt blended in a twin-screw extruder at a speed of 80 rpm and using an incremental temperature profile from 230 to 260° C. for the different barrel zones. The extruded strands were cooled in a water bath, air-dried and pelletized.

Standard test specimens (ASTM test bars) of the obtained blend were injection moulded at a temperature of 220 to 250° C. and test specimens were prepared for mechanical testing. The test results are presented in Table 4.

TABLE 3

Molding Compositions

| component | Ex. 1 wt. -% | Ex. 2 wt. -% | Ex. 3 % |
|---|---|---|---|
| A-I | 24.14 | 24.03 | 23.57 |
| D-I | 19.31 | 19.22 | 18.86 |
| B-I | 24.14 | 24.03 | 23.57 |
| C-I | 28.97 | 28.83 | 28.29 |
| E'-1 | 0.48 | 0.96 | 2.83 |
| F-1 | 0.97 | 0.96 | 0.94 |
| F-2 | 0.29 | 0.29 | 0.28 |
| F-3 | 0.10 | 0.10 | 0.09 |
| F-4 | 0.14 | 0.14 | 0.14 |
| F-5 | 1.45 | 1.44 | 1.41 |
| Total | 100.00 | 100.00 | 100.00 |

TABLE 4

Properties of the Tested Molding Compositions

| | Ex. 1 | Ex. 2 | Ex. 3 |
|---|---|---|---|
| Melt Flow Rate, g/10 min | 3.0 | 3.1 | 3.2 |
| NIIS, kg.cm/cm, 6.4 mm | 14.5 | 16.5 | 14 |
| NIIS, kg.cm/cm, 3.2 mm | 18.5 | 19.5 | 20 |
| TS, kg/cm$^2$ | 560 | 545 | 540 |
| TM, kg/cm$^2$ | 29750 | 28950 | 28650 |
| Elongation at Break, % | 8 | 10 | 11 |
| FS, kg/cm$^2$ | 990 | 955 | 954 |
| FM, kg/cm$^2$, | 30600 | 29400 | 29000 |
| RH, R-Scale, | 115 | 114 | 113 |
| HDT, ° C., Annealed | 110 | 110 | 109 |
| VST, ° C. | 121 | 120 | 120 |

Table 4 shows that the molding compositions according to the invention (Examples 1 to 3) have a high heat deflection temperature (110° C., 109° C.), enhanced impact properties and can be processed easily (MFR of at least 3.0).

The invention claimed is:

1. A thermoplastic molding composition comprising components A, B, C, D, E, and F:
   (A) 15 to 35 wt.-% of at least one graft copolymer (A) consisting of 15 to 60 wt.-% of a graft sheath (A2) and 40 to 85 wt.-% of a graft substrate (A1), wherein (A1) is at least one agglomerated butadiene rubber latex and wherein (A1) and (A2) sum up to 100 wt.-%,
   obtained by emulsion polymerization of
   styrene and acrylonitrile in a weight ratio of 95:5 to 65:35 to obtain a graft sheath (A2), wherein the styrene and/or acrylonitrile is optionally replaced partially by alpha-methylstyrene, methyl methacrylate, maleic anhydride, or mixtures thereof,
   in the presence of the at least one agglomerated butadiene rubber latex (A1) with a median weight particle diameter $D_{50}$ of 150 to 800 nm,
   wherein the agglomerated rubber latex (A1) is obtained by agglomeration of at least one starting butadiene rubber latex (S-A1) having a median weight particle diameter $D_{50}$ of equal to or less than 120 nm;
   (B) 15 to 35 wt.-% of at least one copolymer (B) of alpha-methylstyrene and acrylonitrile in a weight ratio of from 95:5 to 50:50, wherein the alpha-methylstyrene and/or acrylonitrile is optionally partially replaced by methyl methacrylate, maleic anhydride, and/or 4-phenylstyrene;
   (C) 20 to 40 wt.-% of at least one copolymer (C) of styrene and acrylonitrile in a weight ratio of from 95:5 to 50:50, wherein the styrene and/or acrylonitrile is optionally partially replaced by methyl methacrylate, maleic anhydride, and/or 4-phenylstyrene;
wherein copolymer (C) has a weight average molar mass $M_w$ of 150,000 to 300,000 g/mol;
(D) 10 to 30 wt.-% of at least one random terpolymer (D) comprising 13 to 27 wt.-% recurring units of an α, β ethylenically unsaturated cyclic anhydride, 60 to 74 wt.-% recurring units of an aromatic vinyl monomer, and 13 to 27 wt.-% recurring units of a maleimide monomer;
(E) 0.1 to 5 wt.-%, of at least one elastomeric block copolymer (E) comprising at least one block S which forms a hard phase and incorporates units of a vinylaromatic monomer and at least one elastomeric block B/S which forms a soft phase and incorporates both units of a vinylaromatic monomer and of a conjugated diene, wherein S is the vinylaromatic block and B/S is the soft phase, wherein the block is built up randomly from diene units and vinylaromatic units, and wherein the glass transition temperature Tg of the block S is above 25° C., and that of the block B/S is below 25° C., and the phase volume ratio of block S to block B/S is selected so that the proportion of hard phase in the entire block copolymer is from 1 to 40% by volume and the proportion of the diene is less than 50 wt.-%, based on the entire block copolymer (E);
(F) 0 to 5 wt.-% of further additives and/or processing aids (F);
wherein the components A, B, C, D, E, and, if present, F, sum to 100 wt.-%.

2. The thermoplastic molding composition according to claim 1, comprising:
20 to 30 wt.-% component (A),
20 to 30 wt.-% component (B),
25 to 35 wt.-% component (C),
15 to 25 wt.-% component (D),
0.3 to 3 wt.-% component (E), and
0 to 5 wt.-% component (F).

3. The thermoplastic molding composition according to claim 1, wherein component (D) has a glass transition temperature $T_G$ in the range from 180 to 200° C.

4. The thermoplastic molding composition according to claim 1, wherein component (D) is a terpolymer consisting of recurring units of maleic anhydride, styrene, and N-phenyl maleimide.

5. The thermoplastic molding composition according to claim 1, wherein the B/S block of block copolymer (E) is composed of 75 to 30 wt.-% of vinylaromatic monomer and 25 to 70 wt.-% of diene.

6. The thermoplastic molding composition according to claim 1, wherein block copolymer (E) is made from a monomer composition consisting of 25 to 39 wt.-% of diene and 75 to 61 wt.-% of the vinylaromatic monomer.

7. The thermoplastic molding composition according to claim 1, wherein block copolymer (E) is one whose soft phase is divided into blocks $(B/S)_1$ -$(B/S)_2$; $(B/S)_1$ -$(B/S)_2$ -$(B/S)_1$, and $(B/S)_1$ -$(B/S)_2$ -$(B/S)_3$; whose vinylaromatic/diene ratio differs in the individual blocks B/S or changes continuously within a block, the glass transition temperature $T_g$ of each sub-block being below 25° C.

8. The thermoplastic molding composition according to claim 1, wherein in block copolymer (E) the vinylaromatic monomer is styrene and the conjugated diene is 1,3-butadiene.

9. The thermoplastic molding composition according to claim 1, wherein component (B) is a copolymer having a molecular weight Mw of from 20,000 to 220,000 g/mol and a melt flow index (MFI) of 5 to 9 g/10 min.

10. The thermoplastic molding composition according to claim 1, wherein component (E) is partly replaced by at least one elastomeric block copolymer (E'), wherein (E') is a coupled conjugated diene/monovinylarene block copolymer comprising one or more conjugated diene/monovinylarene tapered polymer blocks, wherein in the final block copolymer all conjugated diene is incorporated into the tapered blocks, and, based on the total weight of the final block copolymer, the monovinylarene is present in an amount of 55 to 80 wt.-% and the conjugated diene is present in an amount of 20 to 45 wt.-%.

11. A process for the preparation of the thermoplastic molding composition according to claim 1 by melt mixing the components (A), (B), (C), (D), (E), and, if present, (F), at temperatures in the range of from 160° C. to 400° C.

12. A molded article made from the thermoplastic molding composition according to claim 1.

13. A shaped article for applications in the automotive, household, and healthcare sectors and in the electronics industry comprising the thermoplastic molding composition according to claim 1.

14. The shaped article of claim 13, wherein the shaped article is a thermoformed article, an extruded article, an injection molded article, a calendared article, a blow molded article, a compression molded article, a press sintered article, a deep drawn article, or a sintered article.

15. A thermoplastic molding composition comprising components A, B, C, D, E', and F:
(A) 15 to 35 wt.-% of at least one graft copolymer (A) consisting of 15 to 60 wt.-% of a graft sheath (A2) and 40 to 85 wt.-% of a graft substrate (A1), wherein (A1) is at least one agglomerated butadiene rubber latex and wherein (A1) and (A2) sum up to 100 wt.-%,
obtained by emulsion polymerization of
styrene and acrylonitrile in a weight ratio of 95:5 to 65:35 to obtain a graft sheath (A2), wherein the styrene and/or acrylonitrile is optionally replaced partially by alpha-methylstyrene, methyl methacrylate, maleic anhydride, or mixtures thereof,
in the presence of the at least one agglomerated butadiene rubber latex (A1) with a median weight particle diameter $D_{50}$ of 150 to 800 nm,
wherein the agglomerated rubber latex (A1) is obtained by agglomeration of at least one starting butadiene rubber latex (S-A1) having a median weight particle diameter $D_{50}$ of equal to or less than 120 nm;
(B) 15 to 35 wt.-% of at least one copolymer (B) of alpha-methylstyrene and acrylonitrile in a weight ratio of from 95:5 to 50:50, wherein the alpha-methylstyrene and/or acrylonitrile is optionally partially replaced by methyl methacrylate, maleic anhydride, and/or 4-phenylstyrene;
(C) 20 to 40 wt.-% of at least one copolymer (C) of styrene and acrylonitrile in a weight ratio of from 95:5 to 50:50, wherein the styrene and/or acrylonitrile is optionally partially replaced by methyl methacrylate, maleic anhydride, and/or 4-phenylstyrene;
wherein copolymer (C) has a weight average molar mass $M_w$ of 150,000 to 300,000 g/mol;
(D) 10 to 30 wt.-% of at least one random terpolymer (D) comprising 13 to 27 wt.-% recurring units of an α, β ethylenically unsaturated cyclic anhydride, 60 to 74 wt.-% recurring units of an aromatic vinyl monomer, and 13 to 27 wt.-% recurring units of a maleimide monomer;

(E') 0.1 to 5 wt.-%, of at least one elastomeric block copolymer (E'), wherein (E') is a coupled conjugated diene/monovinylarene block copolymer comprising one or more conjugated diene/monovinylarene tapered polymer blocks, wherein in the final block copolymer all conjugated diene is incorporated into the tapered blocks, and, based on the total weight of the final block copolymer, the monovinylarene is present in an amount of 55 to 80 wt.-%, and the conjugated diene is present in an amount of 20 to 45 wt.-%;

(F) 0 to 5 wt.-% of further additives and/or processing aids (F);

wherein the components A, B, C, D, E', and, if present, F, sum to 100 wt.-%.

16. The thermoplastic molding composition according to claim 15, comprising:
20 to 30 wt.-% component (A),
20 to 30 wt.-% component (B),
25 to 35 wt.-% component (C),
15 to 25 wt.-% component (D),
0.3 to 3 wt.-% component (E'), and
0 to 5 wt.-% component (F).

17. The thermoplastic molding composition according to claim 15, wherein block copolymer (E') comprises at least three consecutive conjugated diene/monovinylarene tapered polymer blocks.

18. The thermoplastic molding composition according to claim 15, wherein in each individual tapered polymer block of block copolymer (E') the monovinylarene is present in an amount of from 2 to 18 wt.-% based on the total weight of the final block copolymer and the conjugated diene is present in an amount of from 8 to 17 wt.-% based on the total weight of the final block copolymer.

19. The thermoplastic molding composition according to claim 15, wherein block copolymer (E') comprises at least one polymer chain of the formula $S1-S2-B1/S3-B2/S4-B3/S5\sim$, wherein S1 and S2 are monovinylarene blocks, blocks B1/S3, B2/S4, and B3/S5 are tapered blocks containing a mixture of monovinylarene and conjugated diene, and ~ is the bond to a coupling agent.

20. The thermoplastic molding composition according to claim 15, wherein component (B) is a copolymer having a molecular weight Mw of from 20,000 to 220,000 g/mol and a melt flow index (MFI) of 5 to 9 g/10 min.

21. A process for the preparation of the thermoplastic molding composition according to claim 15 by melt mixing the components (A), (B), (C), (D), (E'), and, if present, (F), at temperatures in the range of from 160° C. to 400° C.

22. A molded article made from the thermoplastic molding composition according to claim 15.

23. A shaped article for applications in the automotive, household, and healthcare sectors and in the electronics industry comprising the thermoplastic molding composition according to claim 15.

24. The shaped article of claim 23, wherein the shaped article is a thermoformed article, an extruded article, an injection molded article, a calendared article, a blow molded article, a compression molded article, a press sintered article, a deep drawn article, or a sintered article.

* * * * *